Dec. 6, 1966 P. B. BANKS 3,290,132
METHOD AND APPARATUS FOR MANUFACTURING THIN GLASS FILMS
Filed Nov. 26, 1962
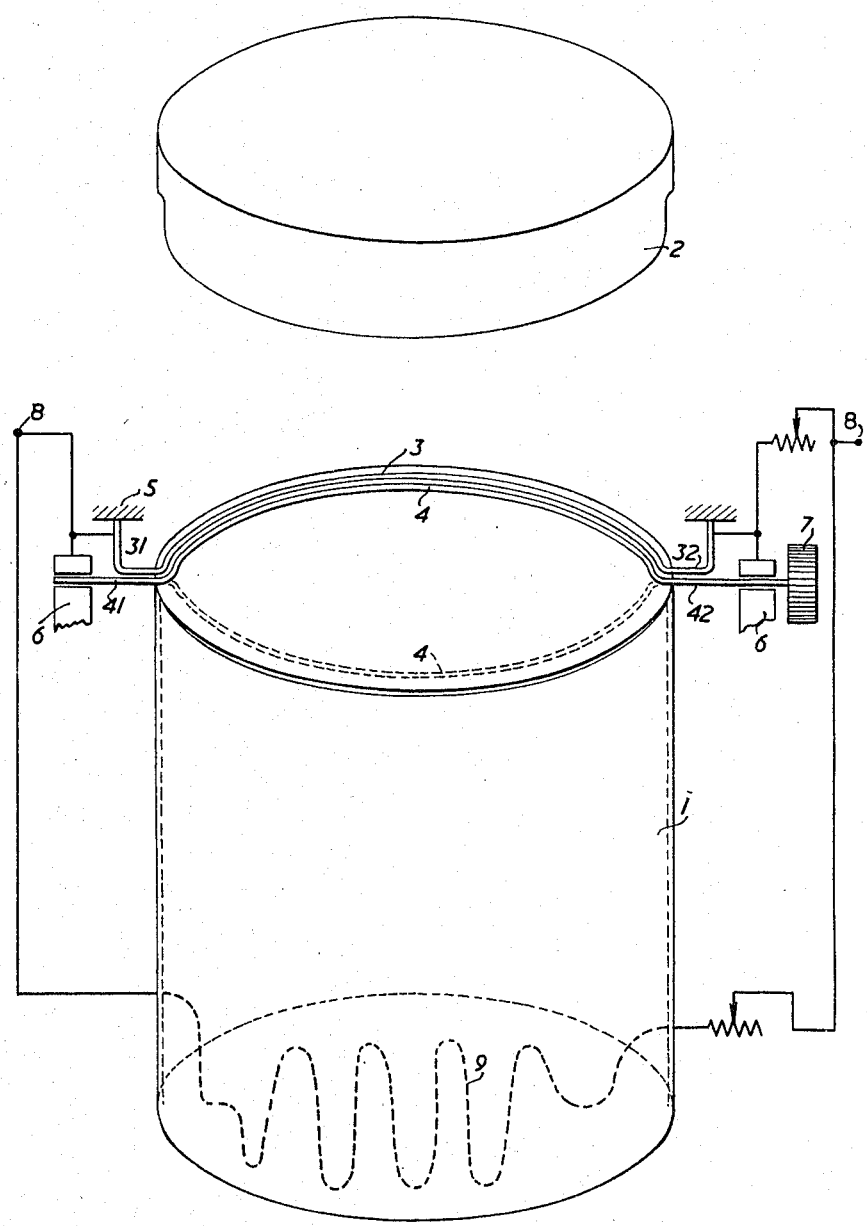
INVENTOR
Peter Baldwin Banks
BY
Baldwin & Wright
ATTORNEYS

United States Patent Office 3,290,132
Patented Dec. 6, 1966

3,290,132
METHOD AND APPARATUS FOR MANU-
FACTURING THIN GLASS FILMS
Peter Baldwin Banks, Rawreth, England, assignor to
English Electric Valve Company Limited, London, England, a British company
Filed Nov. 26, 1962, Ser. No. 240,039
Claims priority, application Great Britain, Oct. 23, 1962,
12,952/62
9 Claims. (Cl. 65—32)

This invention relates to a method and apparatus for manufacturing thin glass films and more specifically to the manufacture of cathode ray tubes having storage targets incorporating, as an essential part of the structure, a thin glass film. The primary, though not the exclusive application of the invention is to the manufacture of image orthicon and similar television camera tubes which, as is well known, have storage target structures based on thin glass film.

The at present usual method of manufacturing the storage target of an image orthicon or similar tube involves the use of normal glass blowing technique to produce a glass film across a supporting metal ring and the subsequent removal of the ring with its film to a chamber in which subsequent process steps in the completion of the target structure on the glass film base are performed. This method involves severe and undesirable limitations. In the first place it is very difficult to make the glass film as thin as is desirable by a glass blowing technique and it may be regarded as impracticable, under normal factory conditions at any rate, to obtain glass films down to a few hundredth parts of a thousandth of an inch by glass blowing. Again since, under practical conditions, glass blowing must be done with air in contact with the heated glass, the choice of the glass materials is limited to these which can be blown in air without suffering unacceptable chemical change and have a sufficiently low setting rate to be capable of being blown satisfactorily. This means that certain glass materials— notably certain borate glasses and glasses containing lithium oxide—which are, in other respects very desirably for use as the glass base of an image orthicon target, cannot be employed. Furthermore—and again because, in practice, the glass blowing has to be done in air—the manufacture of the glass film on its supporting ring has to be carried out as a process separate from the subsequent steps of target manufacture which, of course, cannot be performed under the conditions in which the glass blowing is done. The present invention seeks to avoid these defects and limitations.

According to this invention the glass film base of the storage target structure of a storage type cathode ray tube is manufactured by applying glass material which is to constitute the film to a length of at least one of two metal wires while they are electrically heated to above the softening point of said glass material and which are in contact or near contact with one another over the said length and then rapidly separating to a predetermined extent the wire lengths previously in contact or near contact and simultaneously reducing the electrical heating of the wires so as to draw out a thin film of glass between the separated lengths.

In the simplest way of carrying out the invention the wires are electrically heated by connecting them as resistance heater elements to a source of electric current supply.

Preferably the two wires are similar each comprising two co-linear portions joined by a cranked or curved portion and are mounted side by side with one wire fixed and the other rotatable about the line in which its two co-linear portions lie. With this arrangement the glass material is applied when the wires are heated and lie side by side in contact or near contact. By then rotating the rotatable wire quickly through approximately 180° a thin film of glass is drawn out between the two cranked or curved portions. In normal practice a single application of the glass material will be sufficient for several film drawing operations because, when a film has been drawn after the application of the glass material it will still leave enough glass adhering to the wires to enable further films to be drawn.

Preferably the wires are mounted in a container having a removable lid and preferably also an electrical heating element is mounted in the container so as to maintain the atmosphere therein at a desired temperature. The thickness of film drawn will depend, among other things, on the rate of cooling to which the glass if subjected while it is being drawn into film, the slower the rate of cooling, the thinner the film obtained.

If the glass material is such as to be able to withstand in air without undesirable change, the temperatures to which it is subjected while carrying out this invention, the container may be merely air filled but, by providing a suitable reducing atmosphere, e.g. 90% nitrogen and 10% hydrogen in the container, other desirable glass materials, which could not be made into film by normal glass blowing techniques, can be used.

Not the least of the advantages of the invention is that the glass film, when drawn, is adequately supported between the separated wires and accordingly subsequent steps in the process of manufacturing a storage target on the glass film base can be performed in the same container in which the film has been made.

Experiment with the method of the invention has shown that very thin glass films down to .02 of a thousandth of an inch or even less, and of good uniformity of thickness, are readily obtainable.

Among the more suitable materials for the wires are platinum-coated molybdenum if the atmosphere in the container is air and molybdenum if the atmosphere is a reducing one, e.g. nitrogen and hydrogen as already described. In the case of an air atmosphere a suitable temperature for the wires (when they are in contact or near contact and the glass is applied) is 1000° C. In the case of a reducing atmosphere a temperature of about 1600° C. is suitable. It has been found that if the general temperature in the container is maintained at about 400 to 450° C. a film of a thickness of about .00002" results. With the general temperature at about normal room temperature a film thickness of about .0001" to about .0002" results. Suitable thicknesses for the wires are from 0.02 to 0.1". The numerical examples above given are by way of example only and are neither limiting nor critical.

The invention is illustrated in the accompanying drawing which is a schematic perspective representation of an apparatus for carrying out the invention.

Referring to the drawing, 1 is a base member comprising a cylindrical container of about 4" diameter made of suitable heat insulating material and having a removable lid 2. Mounted to lie near the top of the container proper are two metal wires each comprising two co-linear portions 31, 32 or 41, 42 joined by an approximately semi-circular portion 3 or 4. Both of the metal wires are formed in the shape of one-half of the desired geometric configuration for the thin glass film to be formed thereby. In this particular embodiment, the desired configuration is a circle, but it will be apparent to those skilled in the art that any configuration which is symmetrical about one axis can be formed in accordance with the method and apparatus of this invention by appropriate shaping of the wires. The wire 31–3–32 is fixed between clamps represented at 5 so as to lie horizontally inside and following the curved wall of the container. The other wire is rotatable about the axis of its co-linear portions 41, 42 which are in suitable lightly frictional bearing blocks 6, one end of this wire carrying a knob 7. A heating circuit as shown runs through the wires so that they can be heated to a desired temperature by voltage applied between terminals 8. Near the bottom of the container is a separate and separately controllable heater 9. Means (not shown) may be provided for filling the container (when the lid is on) with a reducing atmosphere. It will, however, be assumed in what follows that the process is to be conducted in air.

The wire 41–4–42 is turned to lie in contact or near contact with the other wire over the curved lengths 3 and 4 as shown in full lines in the drawing. The heater 9 is switched on to bring the general temperature inside the container to a desired value—e.g. 400° C. and, when this has been reached, current is passed through the wires to raise them to the desired temperature. A rod (not shown) of the required glass material is then drawn along the curved wire parts 3 and 4 to leave a deposit of glass adhering thereto. The lid 2 is then put in place. The knob 7 is then turned through 180° so that the wire length 4 is moved to the position shown in broken lines and simultaneously the heating current through the wires is reduced to a suitable value. This action will result in the drawing out of a thin disc-like film of glass (indicated by light shading) of good uniform thickness between the wire parts 3 and 4. Further processing for making a storage target on the film base thus obtained may be carried out in the container 1.

I claim:

1. Apparatus for forming a thin glass film having a geometric configuration which is symmetrical about one axis thereof, said apparatus comprising a first length of wire formed in the shape of one-half of said geometric configuration with respect to said one axis thereof, said first length of wire being rigidly attached to a base member, a second length of wire formed in the shape of the other half of said geometric configuration with respect to said one axis thereof, said second length of wire being rotatably attached to said base member adjacent to said first wire and being movable between a first position in which said two wires are adjacent to each other substantially throughout the entire lengths thereof and a second position which is approximately 180° displaced from said first position, and means for rotating said second wire from said first to said second position thereof, whereby a strip of molten glass, when placed between said two wires in the first position of said second wire, will be stretched into a thin film having the desired geometric configuration when said second wire is rotated from said first to said second position thereof.

2. Apparatus as defined in claim 1 wherein said first and second wires are made of an electrically conductive material, and also including means for passing an electric current through said wires to heat said wires above the melting point of glass to melt a strip of glass placed between said two wires in the first position of said second wire.

3. Apparatus as defined in claim 2 and also including means for progressively reducing the flow of current through said wires to progressively reduce the temperature of said wires below the melting point of said glass when said second wire is rotated from said first to said second position thereof to stretch said molten glass into a thin film having the desired geometric configuration, whereby said thin film of glass will be supported by said first and second wires after it has been formed.

4. Apparatus as defined in claim 3 wherein said base member comprises a closed container having a removable cover, and also including heater means within said container to heat the atmosphere therewithin to a predetermined temperature below the melting point of glass to control the cooling rate of said molten glass when said second wire is rotated from said first to said second position thereof, thereby controlling the thickness of the film formed from said molten glass.

5. Apparatus as defined in claim 4 wherein said geometric configuration is a circle, each of said two wires being formed in the shape of a semi-circle, said container comprising a hollow cylinder which is closed at one end and open at the other end, the length of said hollow cylinder being greater than the radius of said circle, said first wire being rigidly attached to said hollow cylinder at two diametrically opposing points on the inner surface thereof near the open end thereof with the plane defined by said first wire being approximately parallel with the closed end of said hollow cylinder, said second wire being rotatably attached to said hollow cylinder at two diametrically opposing points adjacent to the first mentioned points and being rotatable through an arc of 180° within said hollow cylinder, said heater means comprising an electrical heating element attached to the closed end of said hollow cylinder, and said removable cover comprising a circular top end piece adapted to be attached to the open end of said hollow cylinder.

6. Apparatus as defined in claim 5 and also including first and second electrical brushes coupled respectively to opposing ends of said second wire, a first electrical input terminal coupled to said first electrical brush and to one end of said first wire and to one end of said heating element, a second electrical input terminal coupled to said second electrical brush and to the other end of said first wire and to the other end of said heating element, a first variable resistor coupled in series with both of said wires between said first and second input terminals, and a second variable resistor coupled in series with said heating element between said first and second input terminals, whereby the application of a voltage across said input terminals will produce a flow of current through said wires and said heating element, the flow of current through said wires being controllable by means of said first variable resistor, and the flow of current through said heating element being controllable by said second variable resistor.

7. A method of manufacturing thin glass films comprising the steps of (A) placing a strip of glass between two electrically conductive wires which are in side-by-side relationship to each other, (B) passing an electrical current through said two wires to heat them to a temperature within the range of approximately 800° C. to 1,800° C., thereby melting said strip of glass, (C) heating the atmosphere in the neighborhood of said glass to a temperature within the range of approximately 200° C. to 600° C., (D) spreading said two wires apart by a predetermined amount and simultaneously reducing the flow of current through said wires to progressively reduce the temperature of said wires, thereby stretching said glass into a relatively uniform film and simultaneously cooling said glass below its melting temperature.

8. The method defined in claim 7 wherein said glass is in contact with an atmosphere of air, said wires being heated to approximately 1,000° C., and said atmosphere being heated to a temperature in the range of approximately 400° C. to 450° C. to produce a glass film having a thickness in the order .00002 inch.

9. The method defined in claim 7 wherein said glass is in contact with a reducing atmosphere, said wires being heated to approximately 1,600° C., and said atmosphere being heated to a temperature in the range of approximately 400° C. to 450° C. to produce a glass film having a thickness in the order of .00002 inch.

References Cited by the Examiner
UNITED STATES PATENTS

| | | | |
|---|---|---|---|
| 2,986,843 | 6/1961 | Loukomsky. | |
| 3,083,551 | 4/1963 | Pilkington | 65—32 |
| 3,140,164 | 7/1964 | Long | 65—32 X |
| 3,186,813 | 6/1965 | Pfaender | 65—193 X |
| 3,211,541 | 10/1965 | Leonard | 65—45 |

DONALL H. SYLVESTER, *Primary Examiner.*

F. W. MIGA, *Assistant Examiner.*